United States Patent Office 3,547,617
Patented Dec. 15, 1970

---

3,547,617
HERBICIDAL COMPOSITION AND METHOD
Saburo Tamura and Teruomi Jojima, Tokyo, Japan, assignors to Sankyo Company Limited, Tokyo, Japan
No Drawing. Filed Mar. 12, 1968, Ser. No. 712,350
Claims priority, application Japan, Mar. 17, 1967, 42/16,695; Nov. 6, 1967, 42/71,320; Feb. 27, 1968, 43/12,476; Feb. 28, 1968, 43/12,728
Int. Cl. A01n 9/22
U.S. Cl. 71—92                  2 Claims

ABSTRACT OF THE DISCLOSURE

New use for the inhibition of the growth of undesirable plants such as, for example, grasses, perennial weeds and broad-leafed weeds of a novel compound selected from the group consisting of 3-(2-$C_2$-$C_4$ alkylphenoxy)pyridazines, 3-(2-$C_2$-$C_4$ alkenylphenoxy)pyridazines and 6-chloro derivatives thereof and 3-[2-alkyl-4(or 5)-alkylphenoxy]pyridazines. These novel active compounds have similar herbicidal action, against such undesirable plants as grasses and perennial weeds, and they also show more potent herbicidal action against broad-leafed weeds, as compared with a considerable number of known analogous compounds, and may be applied by a conventional means to said plants, usually in the form of a herbicidal composition comprising said active compound and an inert carrier material, if desired together with a suitable adjuvant.

---

This invention relates to a new use of certain 3-phenoxypyridazine compounds as a herbicide. More particularly, it relates to a method for inhibiting the growth of undesirable plants which comprising applying to the locus to be protected in a herbicidal amount of such 3-phenoxypyridazine compound. Also, it relates to a herbicidal composition which comprises as an active ingredient such 3-phenoxypyridazine compound and an inert carrier material. Still more particularly, it is concerned with a method for inhibiting the growth of undesirable plants, that is, a wide variety of harmful weeds which comprises applying to the locus to be protected, in a sufficient amount to exert a herbicidal action, a member selected from the group consisting of the 3-phenoxypyridazine compounds of the Formula I

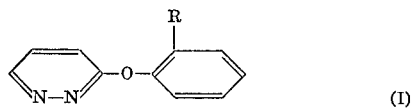

(I)

wherein R is an alkyl group having from 2 to 4 carbon atoms, those of the Formula II

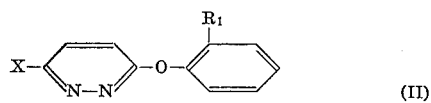

(II)

wherein $R_1$ is an alkenyl group having from 2 to 4 carbon atoms and X is hydrogen or chlorine atom, and those of the Formula III

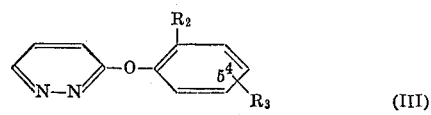

(III)

wherein either $R_2$ or $R_3$ is methyl group and the other is an alkyl group having from 2 to 4 carbon atoms, the group $R_3$ being attached to a ring carbon atom at 4- or 5-position in the phenyl ring. It is also concerned with a herbicidal composition which comprises as an active ingredient one of those 3-phenoxypyridazine compounds as specified hereinabove, together with an inert carrier material.

Herbicidal activity of some 3-phenoxypyridazine compounds was reported and well-known in the art. Thus, it was appeared in Agricultural and Biological Chemistry, 27, 728 (1963) and ibid, 29, 157 (1965) that some 6-chloro-3-alkyl (chloro, alkoxy or nitro) substituted phenoxypyridazine compounds show rather high herbicidal activities. It was also shown in Agricultural and Biological Chemistry, 30, 423 (1966) that 3-phenoxypyridazine shows a desirable herbicidal activity in the submerged pot test. Also, it was found that the 3-phenoxypyridazines having the formula:

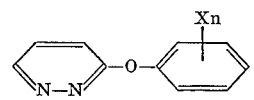

wherein X represents hydrogen atom, methyl group or chlorine atom and $n$ is an integer of 1 to 5 inclusive; provided that, when $n$ is an integer of 1 to 3 inclusive, each X may be the same or different and, when $n$ is an integer of 4 or 5, each X represents chlorine atom as well as some acid addition salts thereof show potent herbicidal activities on a wide variety of weeds, especially grasses and perennial weeds and also selective herbicidal effects in the treatment of such beneficial plants as rice and cotton plants. (Netherlands patent application No. 6604248, filed by Sankyo Company Limited, Japan and laid open to public inspection on Aug. 26, 1966).

As a result of further extensive investigations on herbicidal activity of numerous 3-phenoxypyridazine compounds, it has now been found that a specific group of the 3-phenoxypyridazine compounds having the Formulae I, II and III show similar herbicidal effects on such undesirable plants as, for example, grasses and perennial weeds and especially they show more potent herbicidal effects on the broad-leafed weeds without appreciable degree of phytotoxicity and any adverse effect on beneficial plants, as compared with such 3-phenoxypyridazine compounds as 3-phenoxypyridazine and 3-(2-methylphenoxy) pyridazine that have been believed as effective herbicides in the art.

It is, accordingly, a primary object of this invention to provide a novel and effective method for inhibiting the growth of undesirable plants such as grasses, perennial and broad-leafed weeds and so on which comprises applying to the locus to be protected, in a sufficient amount to exert a herbicidal action, one of those 3-phenoxypyridazine compounds as specified above. It is another object of this invention to provide a herbicidal composition which comprises a herbicidal amount of one of the above-specified 3 - phenoxypyridazine compounds (I), (II) and (III) and a carrier material, if desired together with a suitable adjuvant. Other objects of this invention will become apparent to those skilled in the art with reference to the detailed description of the invention.

The 3-phenoxypyridazine compounds which may be employed as active ingredients in this invention are new compounds which were not disclosed in prior art literature.

These 3-phenoxypyridazine compounds which may be employed as an active ingredient in this invention can be prepared by any of the following procedures; (a) by the melting of a 3-chloropyridazine together with the corresponding substituted phenol in the presence of a base or (b) by the catalytic reduction of the corresponding 3-substituted phenoxy-6-chloropyridazine, provided that the 3-phenoxypyridazine compounds having the above Formula II wherein the X is chlorine atom cannot be prepared by the latter procedure (b).

More particularly, the former procedure may be preferably carried out by melting a 3-chloropyridazine together with a substituted phenol and a base such as anhydrous potassium or sodium carbonate in the absence of a solvent. In this procedure, the melting temperature is preferably in the range of about 100–180° C., the higher temperature being sometimes undesirable because of possible decomposition of a starting 3-chloropyridazine. The reaction is normally completed in about 5–15 minutes.

The latter procedure may be preferably carried out by any of various procedures for catalytic reduction well-known in the art, most preferably by employment of Raney nickel or palladium on carbon. The reduction may be generally conducted at normal temperature and under pressure or under atmospheric pressure, suitably with heating to about 40–50° C., in the presence of a solvent such as an organic solvent, for example, a lower alcohol, benzene, toluene, 2-methoxyethanol, glacial acetic acid or ethyl acetate, a mixture of water and any of these organic solvents, but preferably in the presence of a lower alcohol, for example, methanol because of the solubility of a starting material therein as well as easiness of treatment.

In both procedures, the final product may be recovered by a known technique.

Representative of the 3-phenoxypyridazine compounds having the Formulae I, II and III are:

3-(2-ethylphenoxy)pyridazine (M.P. 47–48° C.),
3-(2-n-propylphenoxy)pyridazine (M.P. 58–61° C.),
3-(2-isopropylphenoxy)pyridazine (M.P. 96.5–98° C.),
3-(2-n-butylphenoxy)pyridazine (B.P. 127–143° C./0.4 mm. Hg),
3-(2-sec.-butylphenoxy)pyridazine (M.P. 53° C.),
3-(2-tert.-butylphenoxy)pyridazine (M.P. 78–79° C.),
6-chloro-3-[2-(2-propenyl)phenoxy]pyridazine (B.P. 167–173° C./1 mm. Hg),
6-chloro-3-[2-(2-methyl-2-propenyl)phenoxy]-pyridazine (M.P. 47° C.),
6-chloro-3-[2-(3-methyl-2-propenyl)phenoxy]-pyridazine (B.P. 160–180° C./0.4 mm. Hg),
3-[2-(2-propenyl)phenoxy]pyridazine (B.P. 140–145° C./0.13 mm. Hg),
3-(2-methyl-5-isopropylphenoxy)pyridazine (B.P. 135–145° C./0.4 mm. Hg),
3-(2-isopropyl-5-methylphenoxy)pyridazine (M.P. 79–80° C.),
3-(2-sec-butyl-5-methylphenoxy)pyridazine (M.P. 57–58° C.),
3-(2-methyl-4-tert.-butylphenoxy)pyridazine and
3-(2-methyl-4-ethylphenoxy)pyridazine.

The active compounds in this invention can be applied in any of various types of the compositions commonly employed in the art. In general, the active compounds can be extended with a carrier material used and commonly referred to in the art such as inert solids, water and organic liquids.

The active compounds mentioned above will be included in such compositions in sufficient amount so that they can exert a herbicidal effect. Usually from about 0.5 to 95% by weight of the active compounds may be included in such formulations.

Solid compositions can be in the form of powders. The compositions thus can be homogeneous powders that can be used as such, diluted with inert solids to form dusts. Natural clays, either absorptive such as attapulgite or relatively non-absorptive such as china clays, diatomaceous earth, bentonite, synthetic fine silica, calcium silicate, talc, pyrophyllite, and other inert solid carriers conventionally employed in powder herbicidal compositions can be satisfactorily used. The active compound usually makes up from about 0.5 to 90%, preferably from about 2 to 10%, of these powder compositions. The solids ordinarily should be very finely divided.

Liquid compositions including the active compound described above can be prepared by admixing the active compound with a suitable liquid diluent medium, together with a suitable emulsifying agent. Typical of the liquid media commonly employed are methanol, benezene, toluene and the like. The active ingredient usually makes up from about 0.5 to 50% of these liquid compositions. Some of these compositions are designated to be used as such, and others to be extended with large quantities of a suitable liquid medium such as water.

Compositions in the form of wettable powders can include one or more surface active agents, such as wetting or dispersing agents. The surface active agents cause the compositions of wettable powders to disperse easily in water to give aqueous sprays.

The surface active agents employed can be of the anionic, cationic or nonionic types. They include, for example, sodium long-chain carboxylates, alkylaryl sulfonates, sodium lauryl sulfate, polyethylene oxides, lignin sulfonates and other surface active agents commonly employed in the art.

When used as a pre-emergence treatment, it is desirable to include a fertilizer, an insecticide, a fungicide or other herbicide such as 2,4 - dichlorophenoxyacetic acid, 2-methyl-4-chlorophenoxyacetic acid and salts, amides and esters thereof, as well as sodium pentachlorophenoxide, 2,4-dichlorophenyl-4′-nitrophenyl ether, 2,4,6 - trichlorophenyl-4′-nitrophenyl ether, 2-methylthio-4,6 - bis(ethylamino)-1,3,5-triazine.

In order to illustrate the preparation of the herbicidal composition in this invention, the following examples are given. It is, of course, intended that this invention is not limited thereto. All parts are given by weight unless otherwise indicated.

EXAMPLE 1

Fifty parts of 3-(2-n-propylphenoxy)pyridazine, 45 parts of bentonite and 5 parts of polyoxyethylene alkyl aryl ether were mixed and pulversized to give a wettable powder.

EXAMPLE 2

Fifty parts of 3-(2-tert.-butylphenoxy)pyridazine, 45 parts of bentonite and 5 parts of polyoxyethylene alkyl ether were mixed and pulverized to give a wettable powder.

EXAMPLE 3

A mixture of 10 parts of 3-(2-ethylphenoxy)pyridazine, 50 parts of bentonite, 40 parts of talc and a small amount of sodium alkylbenzene sulfonate was mixed up with water to make granules, which were then dried and screened to give a granule having a particle size in the range of 20–80 mesh.

EXAMPLE 4

Fifty parts of 6-chloro-3-[2-(2-propenyl)phenoxy] pyridazine, 45 parts of bentonite and 5 parts of sodium alkyl benzene sulfonate were homogeneously mixed to give a wettable powder.

EXAMPLE 5

Five parts of 3-[2-(2-propenyl)phenoxy]pyridazine, 50 parts of bentonite, 38 parts of talc and 7 parts of sodium alkylbenzene sulfonate were uniformly mixed up with water to make granules, which were then dried and screened to give a granule having a particle size in the range of 20–80 mesh.

EXAMPLE 6

Fifty parts of 3-(2-methyl-5-isopropylphenoxy)pyridazine, 45 parts of bentonite and 5 parts of polyoxyethylene alkyl aryl ether were mixed and pulverized to give a wettable powder.

EXAMPLE 7

Fifty parts of 3-(2-methyl-4-tert.-butylphenoxy)pyridazine, 45 parts of bentonite and 5 parts of sodium lauryl sulfate were mixed and pulverized to give a wettable powder.

The herbicidal method of this invention comprises applying the above-specified active compounds to the locus or area to be protected from undesirable plant growth. The active compound is, of course, applied in an amount sufficient to exert the desired herbicidal action, usually in such an amount sufficient to provide at least 50 g. of the active compound per 10 ares.

It may be desirable to apply the active compound, in the form of the aforesaid composition, directly to the soil prior to weed infestation, that is known as a pre-emergence treatment.

The herbicidal effects of the active compounds in this invention are more fully illustrated by the following experiments.

EXPERIMENT 1

Pre-emergence treatment test

Seeds of the following weeds, i.e. barnyardgrass, Taisai (*Brassica chinensis* L.) and common chick weed, each being 50 seeds, were sowed in a ground plot of 1 square meter, in admixture with the surface soil of the depth of about 2 cm. thereunder. The test compounds as named hereinbelow were formulated into wettable powders by a conventional procedure. Those wettable powders were diluted with water and applied by spraying to the seeded ground at rates of 12 g./are and 40 g./are of the test compound. The plot was placed in a green house. On the 25th day after application, germination-inhibiting or killing rates for the test compound were visually investigated. The results are summarized in the following Table I.

It will be noted from the above results that the active compounds in the present invention show similar herbicidal activities against grasses and much higher activities in the inhibition of germination and killing of broad-leafed weeds, as compared with those of the control 3-phenoxypyridazines.

EXPERIMENT 2

Herbicidal test in paddy field

Soils for paddy field were charged into a pot of a surface area of 150 square centimeters, an appreciate number of rice plants (at four or five leaf stage) and slender spikerush were transplanted, seeds of barnyardgrass were sowed and then water was filled at a depth of about 3 cm. over the soil. On the next day, the wettable powders containing the test compounds named below and formulated as in the above Experiment 1, were diluted with water and applied by spraying to the soil at a rate given below of the specific compound per are. After 30 days of the treatment, the growth of slender spikerush, barnyardgrass and spontaneously growing broad-leafed weeds as well as that of rice plants were visually observed. The results are summarized in the following Table II. In this table, herbicidal activities of the test compounds against barnyardgrass and broad-leafed weeds were evaluated upon the following grades:

Herbicidal rating

| | Percent [1] |
|---|---|
| 5 | 0–10 |
| 4 | 11–20 |
| 3 | 21–40 |
| 2 | 41–60 |
| 1 | 61–80 |
| 0 | 81–100 |

[1] Expressed in terms of percentage of the number of growing weeds in the test plots, provided that of growing weeds in a non-treated plot is defined as 100.

And, herbicidal activities of the test compounds against slender spikerush were evaluated upon the grade as defined hereinbelow:

| | |
|---|---|
| 5 | Dead. |
| 4 | Severely damaged. |
| 3 | Considerably damaged. |
| 2 | Moderately damaged. |
| 1 | Slightly damaged. |
| 0 | Not damaged. |

TABLE I.—KILLING RATES OF 3-PHENOXYPYRIDAZINE COMPOUNDS AGAINST GRASSES AND BROAD LEAFED WEEDS (PERCENT)

| | Weed | | | | | |
|---|---|---|---|---|---|---|
| | Barnyardgrass | | Taisei | | Common chick weed | |
| | Application rate (g./are) | | | | | |
| Test compound | 14 | 40 | 14 | 40 | 14 | 40 |
| 3-(2-ethylphenoxy)pyridazine | 100 | 100 | 80 | 100 | 80 | 100 |
| 3-(2-n-propylphenoxy)pyridazine | 100 | 100 | 80 | 100 | 75 | 100 |
| 3-(2-isopropylphenoxy)pyridazine | 100 | 100 | 70 | 100 | 80 | 100 |
| 3-(2-sec.-butylphenoxy)pyridazine | 100 | 100 | 70 | 100 | 80 | 100 |
| 3-(2-tert.-butylphenoxy)pyridazine | 100 | 100 | 80 | 100 | 90 | 100 |
| 6-chloro-3-[2-(2-propenyl)phenoxy]pyridazine | 100 | 100 | 70 | 80 | 70 | 100 |
| 6-chloro-3-[2-(2-methyl-2-propenyl)phenoxy]pyridazine | 100 | 100 | 60 | 80 | 70 | 90 |
| 3-[2-(2-propenyl)phenoxy]pyridazine | 100 | 100 | 70 | 90 | 80 | 100 |
| 3-(2-methyl-5-isopropylphenoxy)pyridazine | 90 | 100 | 90 | 100 | 80 | 100 |
| 3-(2-isopropyl-5-methylphenoxy)pyridazine | 100 | 100 | 100 | 100 | 90 | 100 |
| 3-(2-sec.-butyl-5-methylphenoxy)pyridazine | 90 | 100 | 90 | 100 | 85 | 100 |
| 3-(2-methyl-4-tert.-butylphenoxy)pyridazine | 85 | 100 | 85 | 90 | 80 | 100 |
| 3-(2-methyl-4-ethylphenoxy)pyridazine | 90 | 100 | 80 | 100 | 85 | 100 |
| +3-phenoxypyridazine | 90 | 100 | 40 | 70 | 50 | 60 |
| +3-(2-methylphenoxy)pyridazine | 90 | 100 | 50 | 70 | 55 | 60 |
| +3-(2,5-dimethylphenoxy)pyridazine | 90 | 100 | 60 | 80 | 70 | 90 |
| +3-(3-methyl-4-isopropylphenoxy)pyridazine | 20 | 30 | 0 | 70 | 20 | 40 |
| +3-(3-methyl-4-sec.-butylphenoxy)pyridazine | 40 | 100 | 20 | 70 | 30 | 50 |
| Non-treated | 5 | | 3 | | 10 | |

NOTE: +=Control.

TABLE II.—HERBICIDAL ACTIVITY OF 3-PHENOXYPYRIDAZINE COMPOUND AGAINST BROAD-LEAFED WEEDS AND PERENNIAL WEEDS

| Test compound | Application rate g./are | Herbicidal activity | | | Phytotoxicity to rice plant |
|---|---|---|---|---|---|
| | | Barnyard grass | Broad-leafed weed | Slender spikerush | |
| 3-(2-ethylphenoxy)pyridazine | 30 | 5 | 5 | 4 | Not observed. |
| 3-(2-n-propylphenoxy)pyridazine | 30 | 4 | 4 | 4 | Do. |
| 3-(2-isopropylphenoxy)pyridazine | 30 | 5 | 5 | 4 | Do. |
| 3-(2-sec.-butylphenoxy)pyridazine | 30 | 4 | 5 | 5 | Do. |
| 3-(2-tert.-butylphenoxy)pyridazine | 30 | 5 | 4 | 5 | Do. |
| 6-chloro-3-[2-(2-propenyl)phenoxy]pyridazine | 30 | 5 | 4 | 4 | Do. |
| 6-chloro-3-[2-(2-methyl-2-propenyl)phenoxy]pyridazine | 30 | 5 | 4 | 4 | Do. |
| 3-[2-(2-propenyl)phenoxy]pyridazine | 30 | 4 | 5 | 4 | Do. |
| 3-(2-methyl-5-isopropylphenoxy)pyridazine | 10 | 5 | 4 | 5 | Do. |
| 3-(2-isopropyl-5-methylphenoxy)pyridazine | 10 | 5 | 5 | 4 | Do. |
| 3-(2-sec.-butyl-5-methylphenoxy)pyridazine | 10 | 5 | 5 | 4 | Do |
| 3-(2-methyl-4-tert.-butylphenoxy)pyridazine | 10 | 4 | 5 | 4 | Do. |
| 3-(2-methyl-4-ethylphenoxy)pyridazine | 10 | 4 | 5 | 4 | Do. |
| + 3-phenoxypyridazine | 30 | 4 | 2 | 3 | Do. |
| + 3-(2-methylphenoxy)pyridazine | 30 | 5 | 2 | 4 | Do. |
| + 3-(2,4-dimethylphenoxy)pyridazine | 10 | 4 | 2 | 3 | Do. |
| + 3-(3-methyl-4-isopropylphenoxy)pyridazine | 10 | 1 | 0 | 0 | Do. |

NOTE: + = Control.

It will be clearly shown from the above results that the active compounds in this invention exert a potent herbicidal activity against various weeds, especially broad-leafed weeds, without phytotoxicity to rice plants, as compared with those control 3-phenoxypyridazine compounds.

What is claimed is:

1. A method for inhibiting the growth of undesirable plants which comprises applying to the locus to be protected, in an amount sufficient to exert a herbicidal action, a compound selected from the group consisting of the compounds having the formula:

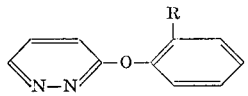

wherein R is an alkyl group having from 2 to 4 carbon atoms.

2. The method according to claim 1, wherein said compound is selected from the group consisting of:

3-(2-ethylphenoxy)pyridazine,
3-(2-n-propylphenoxy)pyridazine,
3-(2-isopropylphenoxy)pyridazine,
3-(2-sec.-butylphenoxy)pyridazine and
3-(2-tert.-butylphenoxy)pyridazine.

References Cited

UNITED STATES PATENTS 3,427,146  2/1969  Tamura et al. _____ 71—92

OTHER REFERENCES

Tamura et al.: "Synthesis of Pyridazine Ders. etc.," 1963 CA60, p. 2928 (1964).

Tamura et al.: "Herbicidal Activity of Some Pyridazine Derivatives" (1963), Chem. Abs. 60, p. 7379 (1964).

Jojima et al.: "Synthesis of Pyridazine Derivatives as Herbicides" (1965), Chem. Abs., p. 601 (1965).

LEWIS GOTTS, Primary Examiner

C. L. MILLS, Assistant Examiner

U.S. Cl. X.R.

424—250